US009418787B2

(12) United States Patent
Ponzio et al.

(10) Patent No.: US 9,418,787 B2
(45) Date of Patent: Aug. 16, 2016

(54) APPARATUS AND METHOD FOR WINDING POLES OF CORES FOR ELECTRIC DYNAMO MACHINES (75) Inventors: Massimo Ponzio, Florence (IT); Giovanni Manuelli, Florence (IT)

(73) Assignee: ATOP S.p.A., Barberino Val d'Elsa, Florence (IT)

(*) Notice: Subject to any disclaimer, the term of this patent is extended or adjusted under 35 U.S.C. 154(b) by 330 days.

(21) Appl. No.: 14/131,578

(22) PCT Filed: Jul. 10, 2012

(86) PCT No.: PCT/IB2012/053530
§ 371 (c)(1),
(2), (4) Date: Jan. 8, 2014

(87) PCT Pub. No.: WO2013/008183
PCT Pub. Date: Jan. 17, 2013

(65) Prior Publication Data
US 2014/0151489 A1  Jun. 5, 2014

(30) Foreign Application Priority Data
Jul. 14, 2011  (IT) ................. PI2011A0078

(51) Int. Cl.
*H02K 15/09*  (2006.01)
*H01F 41/06*  (2016.01)
(Continued)

(52) U.S. Cl.
CPC .......... *H01F 41/0612* (2013.01); *H01F 41/064* (2016.01); *H01F 41/082* (2016.01); *H02K 15/0075* (2013.01); *H02K 15/095* (2013.01)

(58) Field of Classification Search
CPC .............. H02K 15/00; H02K 15/0031; H02K 15/0068; H02K 15/0081; H02K 15/02; H02K 15/024; H02K 15/026; H02K 15/0442; H01F 41/0162; H01F 41/0645
USPC ...................... 242/433.1, 433.4, 439.1, 439.2
See application file for complete search history.

(56) References Cited

U.S. PATENT DOCUMENTS 4,340,186 A * 7/1982 Shimada ................ B65H 54/10
140/92.1
5,257,745 A * 11/1993 Lombardi .............. H02K 15/09
242/433.4
(Continued)

FOREIGN PATENT DOCUMENTS

EP  1 324 471  7/2003
JP  1998 112962  4/1998

OTHER PUBLICATIONS

International Search Report and Written Opinion dated Feb. 7, 2014 for PCT/IB2012/053530.

*Primary Examiner* — Emmanuel M Marcelo
(74) *Attorney, Agent, or Firm* — Ropes & Gray LLP (57) ABSTRACT Apparatus and method for winding coils (B) of conductor wire (W) around respective poles (10c) of a core (10) of a component of a electric dynamo machine, wherein a dispenser arm (11) rotates around the poles to deliver the wire (W) to form wire turns; a first wire guide (32) is positioned and moved during winding adjacent to an axial end (A) of a pole (10c) being wound; a second wire guide (36) is positioned and moved in a first slot (10a) adjacent to the pole (10c) being wound; a third wire guide (37) is positioned and moved in a second slot (10b) adjacent to the pole (10c) being wound. A termination member (80) is capable of achieving connection of the coil leads to termination structures (91) of the core (FIG. 5).

21 Claims, 5 Drawing Sheets (51) Int. Cl.
*H02K 15/095* (2006.01)
*H02K 15/00* (2006.01)

(56) References Cited

U.S. PATENT DOCUMENTS

| | | | | |
|---|---|---|---|---|
| 5,484,114 | A | 1/1996 | Santandrea et al. | |
| 5,586,383 | A * | 12/1996 | Dolgas | H02K 1/12 242/432.6 |
| 5,794,884 | A * | 8/1998 | Dolgas | H02K 1/12 242/433.3 |
| 6,062,504 | A * | 5/2000 | Luciani | H02K 15/085 242/433.4 |
| 6,325,318 | B1 * | 12/2001 | Stratico | H02K 15/095 242/432 |
| 6,419,181 | B1 * | 7/2002 | Stratico | H02K 15/095 242/433.3 |
| 6,848,646 | B2 * | 2/2005 | Ponzio | H01F 41/0645 242/433.4 |

* cited by examiner

APPARATUS AND METHOD FOR WINDING POLES OF CORES FOR ELECTRIC DYNAMO MACHINES

BACKGROUND OF THE INVENTION

The present invention relates to winding coils of electric dynamo machines. In particular, the solutions of the invention relate to winding poles of cores where the slots for receiving the coils have external openings.

The turns of the coils are wound by at least one dispenser arm capable of delivering wire on the surfaces of wire guide members, where the wire runs to reach predetermined positions in the slots. The final winding result requires that the wire of the turns be deposited in the slots according to a predetermined disposition, therefore not randomly.

The turns of the coils are positioned during winding according to a required disposition to optimize the quantity of conductor wire that can occupy the available space of the slot. Furthermore, the turns should not cross each other, or be excessively deformed locally to avoid damaging the wire insulation.

The disposition of the turns around a pole foresees progressively winding a series of turns in the radial direction of the core. One turn is wound along the sides and along the axial ends of the pole. The sides of the pole delimit a slot. The succession of turns wound in this manner forms a layer of turns. Within the layer, the turns have a so called "radial stratification"; in other words a disposition where the turns are one next to the other in the radial direction of the pole that is being wound.

To complete the coil further layers are formed. In each further layer the turns are again wound one next to the other in the radial direction of the pole. A further layer is formed above the layer wound previously, therefore positioning of the successive layers occurs in an angular direction of the core to form the so called "stratification of the layers of the turns".

In a same slot, there will be positioned portions of two coils (layers of turns). Each portion of a coil is wound around a pole that is adjacent to two poles. Therefore, there are specific portions of the slot space occupied by respective coil portions of coils, and there is a certain part of the slot space which remains empty. This empty part is a delimitation area between the portions of the coils wound in the same slot. The empty portion is radially aligned with the opening of the slot where the wire passes to enter the slot during winding.

Winding in this context may require connection of the coil leads to termination structures of core, like tangs or other devices, where the wire needs to be connected, for example by wrapping or insertion techniques.

Machines and methods for winding coils in the context described above are described in U.S. Pat. No. 6,848,646. In this case, the solution foresees a dispenser arm that rotates around the poles to dispense the wire forming wire turns. The wire leaving the dispenser arm is intercepted by a wire guide assembly, which is aligned with the aperture of the slots and with the position of the pole where the turns being wound need to be positioned.

In the solution of this document no parts of the wire guide enter the slots of the core, and the part of the wire guide that guarantees the radial stratification of the turns along the pole is progressively distanced from the axial end of the core, as the layers are formed in order to perform depositing of the wire correctly.

The solutions of publication EP 1420505 make use of a needle provided with translation motion, and rotation of the core to wind the turns around the poles. If the needle is sufficiently narrow, it can be made to pass though the openings of the slots, and therefore the needle can accomplish deposition trajectories producing radial stratification.

The needle solution has a trajectory consisting of translations combined with rotations with respect to the core. The resulting trajectory has stretches where loss of tension occurs on the wire (particularly for a wire that is greater than a certain diameter) due to an excessive release of wire from the needle.

The stretches of wire where this release occurs are difficult to position around the pole. Furthermore, the size of the needle thickness that enters the slot and occupies the empty portion of the slot, which delimits the portions of coils present, impedes a maximum and optimized filling of turns with respect to the available space.

The solution of the present invention are capable of achieving the maximum filling of turns in the slots using a stratified disposition in the radial direction and of the layers in the angular direction.

Furthermore, the solution of the present invention is capable of achieving connection of the coil leads to termination structures of the core.

In relation to termination solutions, EP 1,353,436 describes solutions for accomplishing connections of the coil leads to termination structures of the core using a rotating flyer arm for winding and a wire guide for accomplishing radial stratification of the turns along the pole.

SUMMARY OF THE INVENTION

It is therefore one object of the invention to wind cores having slots with external openings so that the wire forming the turns is correctly tensioned and results properly positioned in the slots using a wire dispenser that has a rotating trajectory to deliver the wire to be wound.

It is a further object of the present invention to guarantee that the wire wound on the pole of the core results correctly positioned in all areas of the slot that is available for the turns of wire.

It is also an object of the invention to guarantee a maximum filling of the slots of the core.

It is another object of the invention to provide a winding solution that is rapid in the time necessary for winding the coils of the core.

It is a further object of the present invention to also achieve connection of the coil leads to termination structures of the core.

These and other objects are achieved by the present invention through an apparatus according to the appended independent apparatus claim 1 or through the appended independent method claim 12 or through the appended independent apparatus claim 21. Further characteristics of the invention are set out in the dependent claims.

BRIEF DESCRIPTION OF THE DRAWINGS

These and other objects and advantages of the invention will become apparent from the following detailed description, which is only provided by way of non-limiting example, with reference to the annexed drawings, wherein.

DETAILED DESCRIPTION OF THE INVENTION

Figure 1:
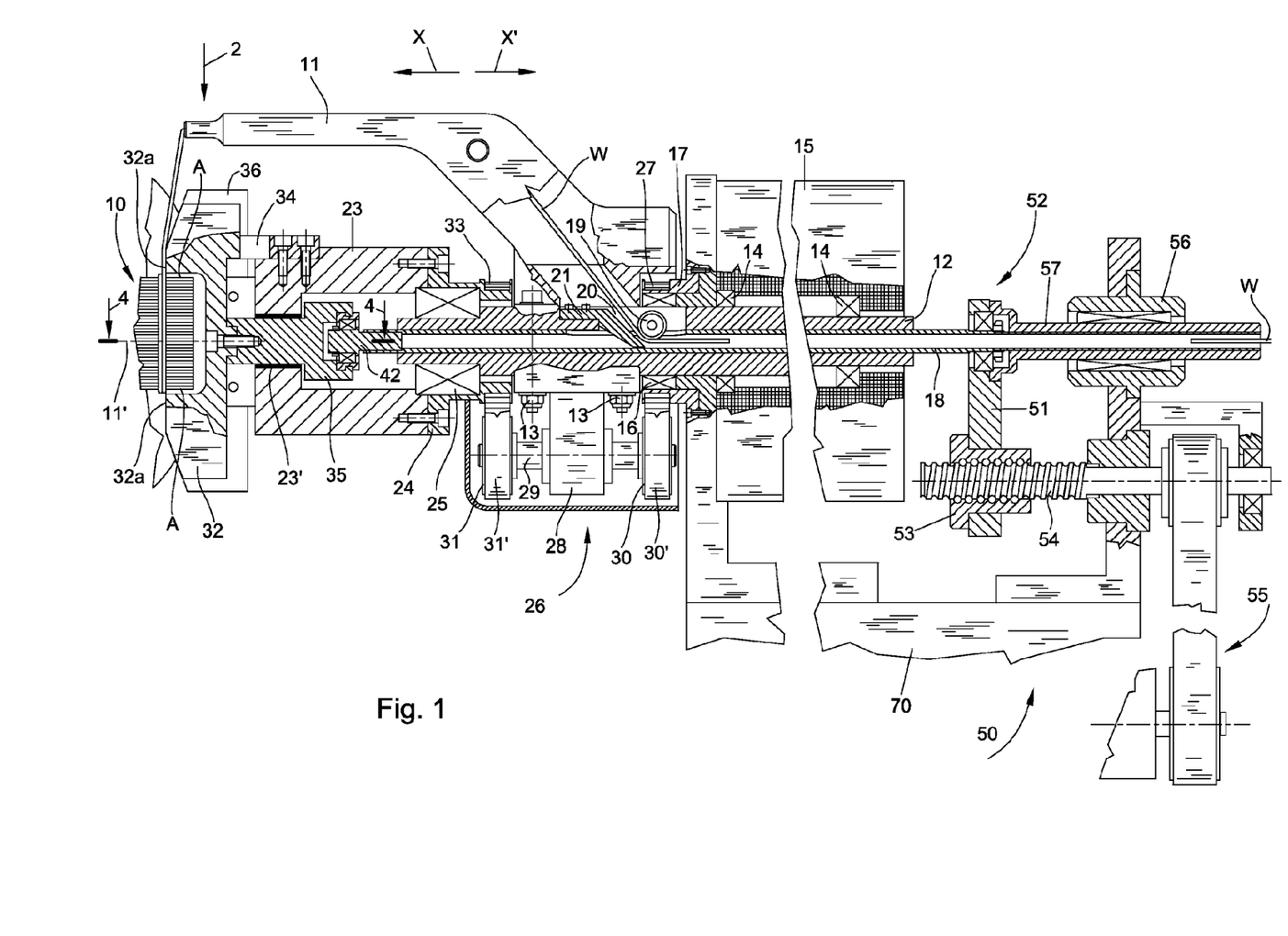
FIG. 1 is an elevation view with a partial section of the apparatus of the solution of the invention.
Figure 2:
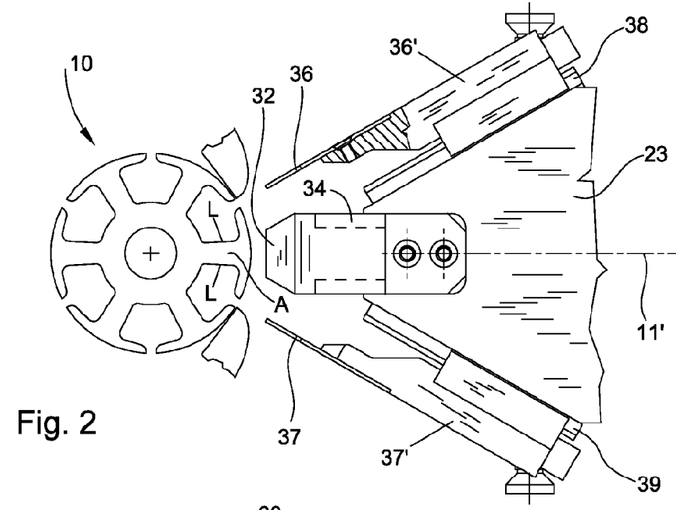
FIG. 2 is a partial view according to direction 2 of FIG. 1 with certain parts omitted for reasons of clarity showing an operation stage before starting winding.
Figure 3:
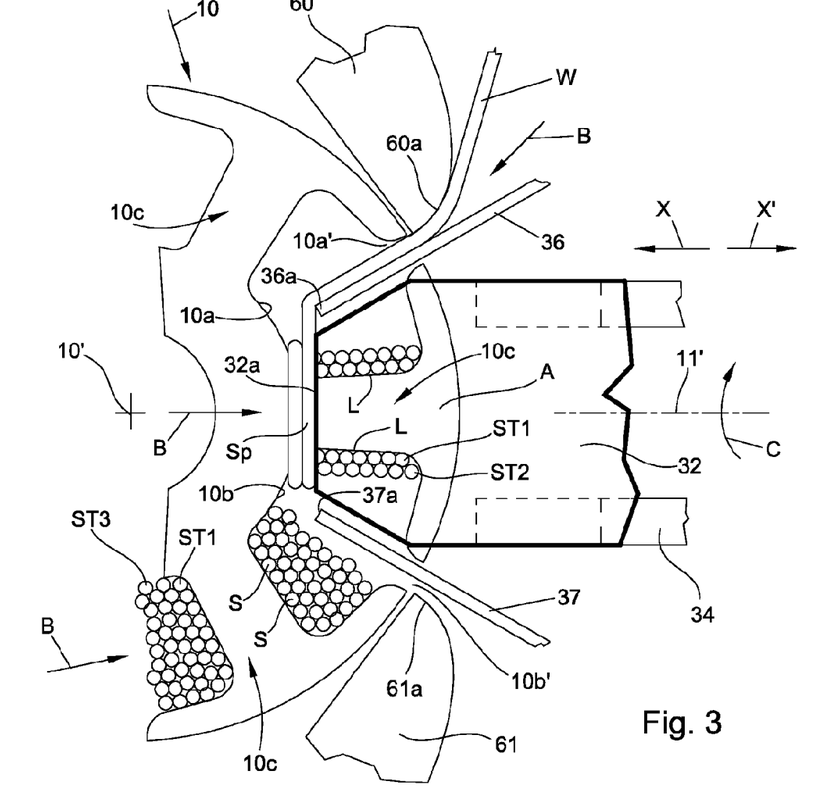
FIG. 3 is an enlarged view from direction 2 of FIG. 1 showing a winding stage of the core using the solution of the invention.

With reference to FIGS. 1-4, and in particular to the enlarged view of FIG. 3, there is shown a core 10 of a dynamo electric machine having slots 10a and 10b which delimit pole 10c. Slots 10a and 10b have respective apertures 10a' and 10b' facing externally, when considered in their orientation with respect to a central axis 10' of the core. In FIG. 3, a guide member 32 has been illustrated transparent to show the area below pole 10c. Furthermore, turns Sp which cross pole 10c are shown without section, whilst others indicated with S and represented by a circle, are sectioned for reasons of clarity and simplification of the explanations.

The turns Sp and S of coils B of wire W are wound in slots 10a and 10b according to a required disposition. In particular, as shown in FIG. 3 a first stretch of a turn of layer ST1 of coils B is positioned against a longitudinal sides L and axial ends A of pole 10c which delimit a slot. Other layers of turns ST2, ST3 become progressively superimposed overlapped as shown in FIG. 3.

With reference to FIG. 1, the apparatus of the invention comprises a dispenser arm 11 fixed to a rotor shaft 12 by means of a clamp fastened by bolts 13. In FIGS. 2 and 3 the dispenser arm 11 has been omitted for reasons of clarity.

In FIG. 1 the rotor shaft 12 is shown as a hollow member supported on bearings 14 of a motor 15 and bearing of a hub 17. Furthermore, a tubular member 18 is foreseen seated in shaft 12, as shown in FIG. 1.

The winding wire W travels through the tubular member and is re-directed at a pulley wheel 19, which is integral to shaft 12. At pulley wheel 19, aligned slots are present on member 18 and shaft 12, as shown in FIG. 1. These slots of member 18 and shaft 12 form a passage 20 for wire W to reach an exit of dispenser arm 11, as shown in FIG. 1. A wire guide 21 fixed to shaft 12 by means of bolts (shown in the figures but not numbered) is located in the slots of member 18 and shaft 12 to form a wall of passage 20. The wire guide 21 also acts as an engagement member with member 18 to accomplish that member 18 and shaft 12 are angularly integral (for rotation around axis of rotation 11' of dispenser arm 11).

When shaft 12 is rotated by a stator part of motor 15, according to known technical principles, the dispenser arm 11 rotates around axis 11' to deliver wire W from the exit of dispenser arm 11, as shown in the figures. At the same time, also tubular member 18 rotates around axis 11', seeing that tubular member 18 is integral to shaft 12 due to the engagement of member 21 described above.

A second support member 23 is joined to a collar 24 by means of the bolts shown, but not numbered in FIG. 1. Collar 24 is assembled on bearing 25, which in turn is assembled on the end of shaft 12, as shown in FIG. 1. Therefore, the second support member 23 is assembled free to rotate on shaft 12. However, as will be described in the following, the rotation of member 23 is impeded by a belt mechanism 26.

The belt mechanism 26 foresees a toothed pulley wheel 27, which is integral to fixed hub 17. Shaft 29 is assembled in an idle manner on an extension 28 of the clamp of dispenser arm 11. The two ends of arm 29 support idle pulley wheels 30 and 31. Toothed pulley wheel 30 is connected by means of a belt 30' to the toothed pulley wheel 27, whilst pulley wheel 31 is connected by means of a further belt 31' to toothed pulley wheel 33, which is integral to collar 24. The transmission ratios of pulley wheel 27 with pulley wheel 30 and of pulley wheel 33 with pulley wheel 31 are the same. Therefore, when dispenser arm 11 is rotated, shaft 29 rotates integral to it, and collar 24 is caused to remain stationary. Consequently the second support member 23 remains stationary due to the belt mechanism 26.

In an embodiment that has been foreseen, but not shown in the figures, the belt mechanism 26 can be substituted with a gear mechanism. The gear mechanism is provided with two pairs of engaged gear wheels, each pair of engaged gear wheel substitutes pulley wheels 27 and 30 and pulley wheels 33 and 31. The transmission ratio between the pair engaged gear wheels that substitute the pulley wheels 27 and 30 is equal to the transmission ratio existing between the pair engaged gear wheels that substitute the pulley wheels 33 and 31.

With reference to FIG. 1, a support member 35 is connected to the tubular member 18 by means of joint 42 which is equipped with a bearing. In this way the translations of tubular member 18 in directions X and X' are transmitted integrally to support member 35, whilst the rotations of tubular member 18 around axis 11' are not transmitted to support member 35.

Figure 4:
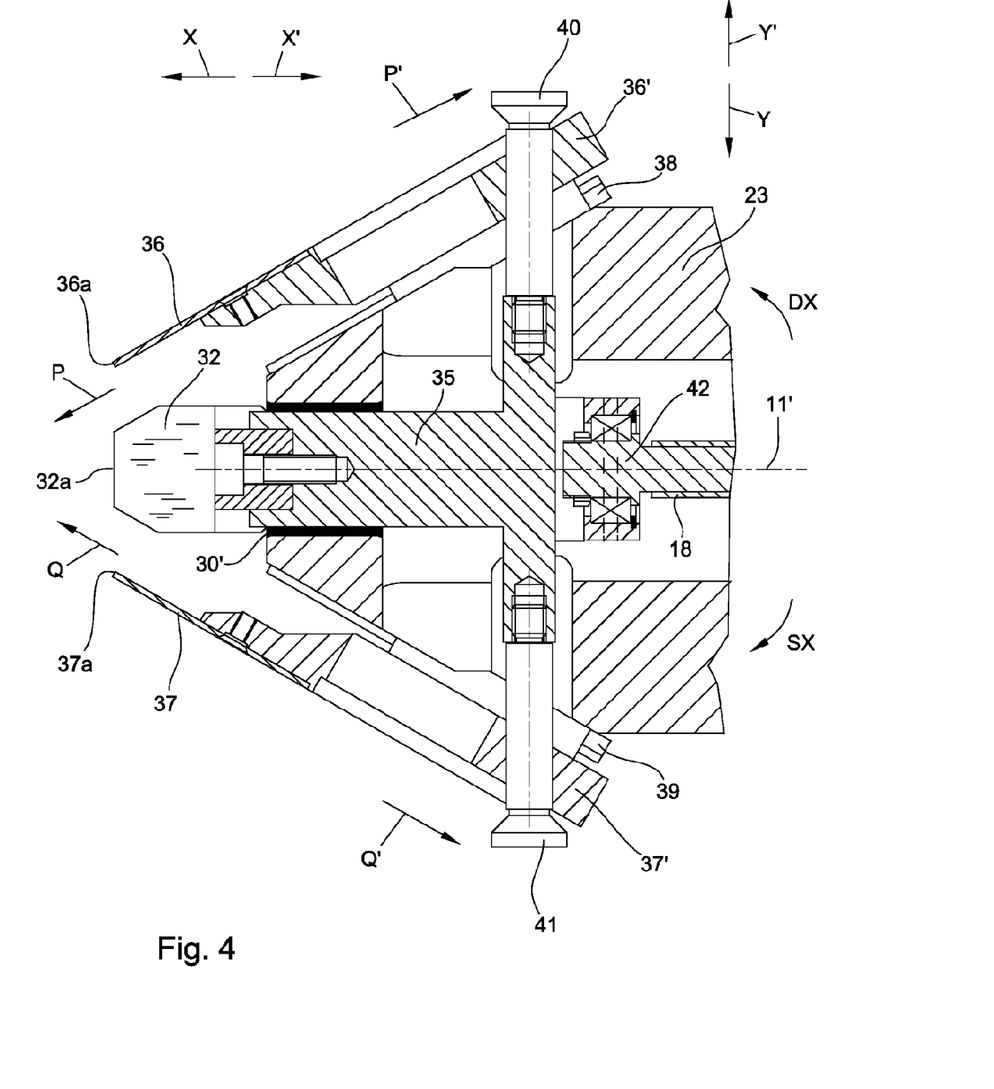
FIG. 4 is a partial section view according to directions 4-4 of FIG. 1.
Figure 6:
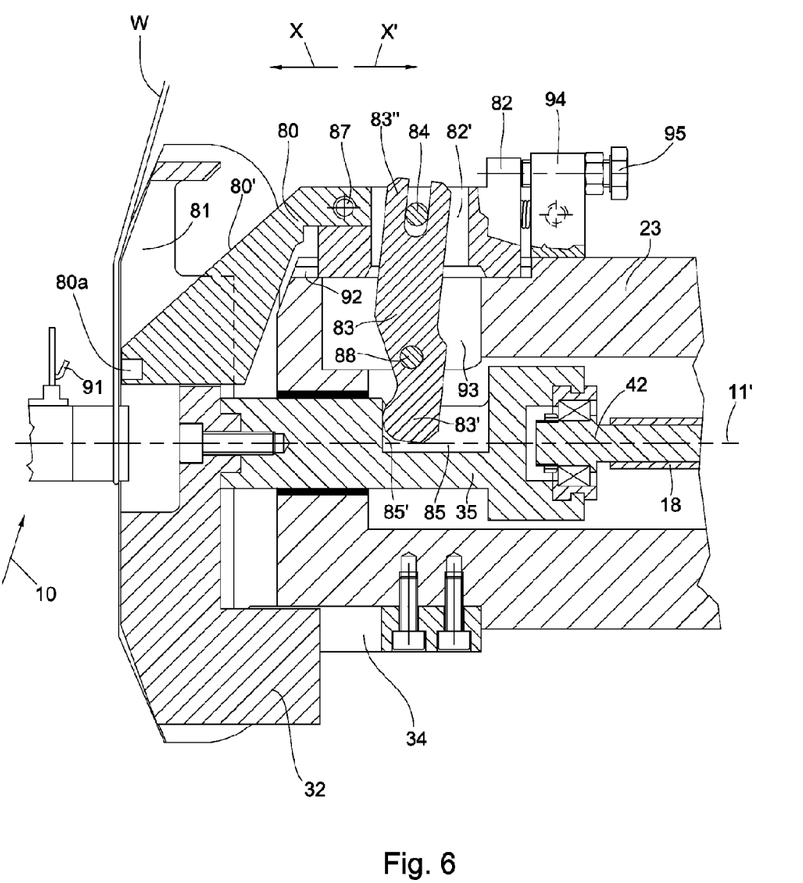
FIG. 6 is a section view as seen from directions 6-6 of FIG. 5.

A first guide 32 for winding wire W in the slots to form the coils is fixed to support member 35 by means of a central bolt (see FIGS. 1 and 4). The movement of the support member 35 in directions X and X' is guided and supported by the second support member 23 on bushing 23' (see in particular FIGS. 1 and 4). To impede possible rotations of the first guide 32 around axis 11', an engagement fork 34 is foreseen fixed to the second support member 23 by means of bolts, as shown in FIGS. 1, 2 and 6.

With particular reference to FIGS. 2, 3 and 4, a second wire guide 36 and a third wire guide 37 are present. Both of these are necessary for winding wire W, as shown in FIGS. 1-6. Each of the wire guides 36 and 37 can be in the form of a blade, which extends for a length that is longer than side L of the core, as shown in figure for wire guide 36. The wire guides 36 and 37 are particularly necessary for correctly positioning the turns in the layers STi, which are more distant from the sides L and the axial ends A of the pole. The wire guides 36 and 37 are assembled to be integral respectively with slides 36' and 37' (see FIGS. 2 and 4). Slides 36' and 37' are moveable respectively on guides 38 and 39. Guides 38 and 39 are inclined by a predetermined angle with respect to the rotation axis 11' and are located on respective sides DX and SX.

Each of the guides 38 and 39 is formed of two guides positioned at a certain distance from each other on member 23 (a superior guide and an inferior guide) positioned symmetrically with respect to axis 11'. In FIG. 2, the superior guides of the guides 38 and 39 are shown, whilst in FIG. 4, the inferior guides of the guides 38 and 39 are shown.

Bolts 40 and 41 (see FIG. 4) respectively connect slide 36' and slide 37' to the support member 35. In this way, when there is movement of support member 35 in direction X, slides 36' and 37' respectively move in directions P and Q, whilst when there is movement of support member 35 in the X' direction, slides 36' and 37' respectively move in directions P' and Q'. Therefore, guides 36 and 37 move in respective directions P,Q,P',Q' integral with the respective slides 36' and 37' to which they are connected.

To move the support member 35 in directions X and X', the tubular member 18 is capable of moving in directions X and X' by means of the movement assembly 50 shown in FIG. 1. More particularly, arm 51 is fixed to member 18 by means of the rotation joint 52, although rotation joint 52 allows rotation of tubular member 18 around axis 11'. Sleeve 53 is fixed to arm 51. Sleeve 53 has internal helical grooves for circulation of balls present on screw 54. Screw 54 is rotated by transmission 55 consisting of a motor belt. The motor of transmission 55 is controlled according to predetermined programs to assure that tubular member 18 accomplishes required movements in directions X and X' as a function of time and the rotation of dispenser arm 11.

With reference to FIG. 1, guide 56 supports tube 57, which is fixed to arm 51, to guide translation of tube 57 in directions X and X'.

With reference to FIG. 3, an instant of the winding cycle to form the turns of wire is shown. Before the instant shown in FIG. 3 and to form the turn that is shown partially wound in FIG. 3, wire W that is exiting dispenser 11 in the stage of clockwise rotation C around axis 11', engages guide 37 and runs along it to reach edge 37a. Continuing with the rotation of the dispenser arm 11, wire W passes from edge 37a to edge 32a of guide 32. Here it runs to become positioned on the pole as shown in FIG. 3. Successively, during the rotation of dispenser arm 11, wire W runs on edge 36a, and, at the end, engages an edge 60a of deflector 60 to exit from slot 10a.

The alignment which is guaranteed by guides 38 and 39 of the edges of wire guides 36a and 37a with the position of the slots and the pole where the wire needs to be deposited (see FIG. 3) guarantees minimum bending of wire W, and minimum variation of tension of wire W in the stage of forming of a turn. At the same time, the position of support member 35 determines the positions of guides 38 and 39 and of edge 32a, therefore the simultaneous alignment of wire guide edges 36a, 37a and 32a between each other and with the pole 10c to form the turns correctly.

When the number of layers ST increases, the formation of the turns occurs very near to the area of the slots 10a and 10b occupied by the delimiting space required for wire guides 36 and 37. In this situation, edges 36a and 37a deliver the wire W directly on the turns that have been formed, seeing that the latter are adjacent to edges 36a and 37b. Therefore, it is particularly important to achieve an accurate movement of edges 36a and 37a aside the pole 10c by means of the movements in directions X and X' so that deposit of the turns occurs one next to the other without crossing each other.

Deflectors 60 and 61 shown enlarged in FIG. 3, functions as wire deflectors to avoid contact of the wire with the edge of the slot opening, where they are next to and covering, as shown in FIG. 3. Therefore, deflector 61 with its edge 61a avoids contact of the wire with the edge of opening 10b' when the wire enters slot 10b during the clockwise rotation C.

The assembly for moving member 35, which uses transmission 55, can comprise a control unit for achieving that the motor rotates screw 54 for predefined angles contained in a program. The control unit applies the program and guarantees in real time that screw 54 rotates with rotations linked by a predefined function to the rotation angles of dispenser arm 11.

In this manner the guide edges 36a, 37a, 32a are positioned in alignment with the position of pole 10c, being wound as a function of the rotations of dispenser arm 11. This achieves the alignment of edges 36a, 37a, 32a with the angular position around axis 11' of the wire stretch W which extends from dispenser arm 11 to core 10.

As shown with particular reference to FIG. 1, the wire guide 32, is provided with two edges 32a, each for guiding the wire in correspondence to a respective axial end A of the core 10. In this way, the action of a guide edge 32a, described with particular reference to FIG. 3, occurs in correspondence with the two axial ends A of core 10 for each complete rotation of dispenser arm 11.

FIG. 2 illustrates the second support member 23 in a position that is more distant from core 10 in directions X and X' with respect to the position which it occupies during winding as shown in the other figures. This positioning situation of FIG. 2 is necessary for placing the core 10 before winding, and at the end of operations, when winding has been completed. To reach the situation of FIG. 2, a movement assembly (not shown) is able to move the entire apparatus shown in FIG. 1 in directions X and X', to position it near or away with respect to core 10, by moving part 70 in direction X and X'.

Figure 5:
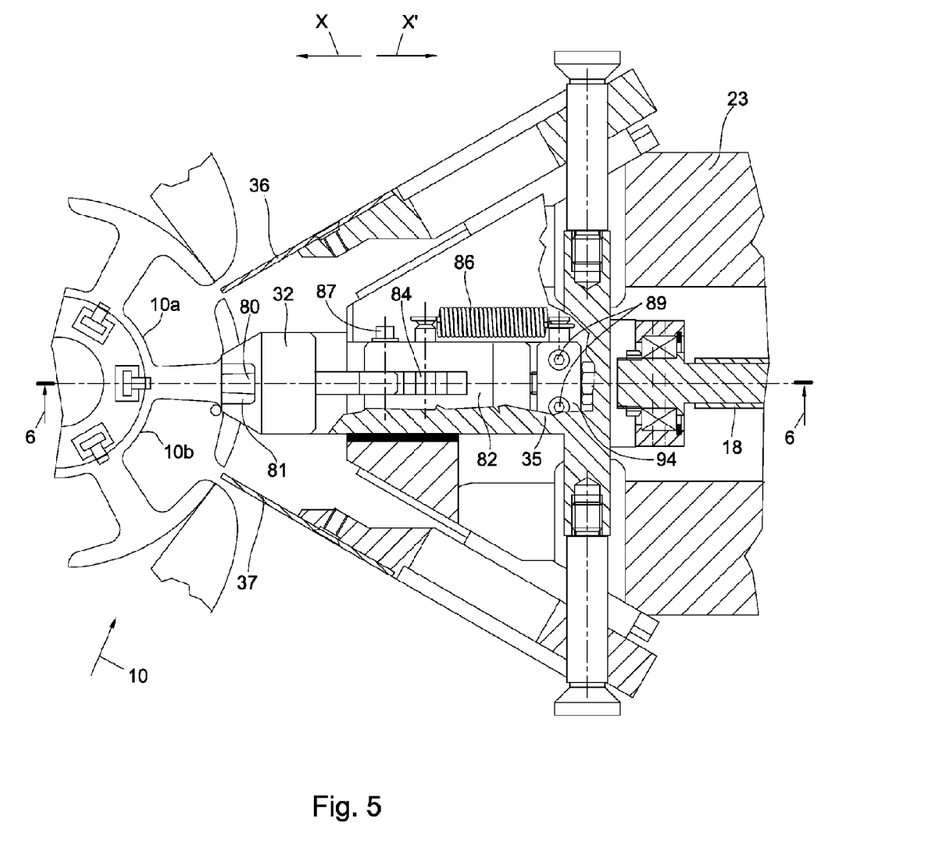
FIG. 5 is a partial section view of an embodiment of the invention that is capable of connecting coil leads to termination structures of the core. The section part of FIG. 5 is similar to the view of FIG. 4.

With reference to FIGS. 5 and 6, an embodiment is shown where a termination member 80 is capable of partially seating in seat 80a a termination structure like a tang 91. This seating condition is achieved by moving member 80 in direction X from the condition shown in FIGS. 5 and 6. When tang 91 is partially seated in seat 80a, dispenser arm 11 performs rotation around axis 11' to deliver wire W, which becomes intercepted by an inclined surface 80' of the termination member 80. The wire runs along the inclined surface 80' to reach a final position in the trough portion of tang 91. Here, the wire remains seated for connection to tang 91. Further rotations of the dispenser arm 11 wraps the wire W sufficiently around tang 91.

Similar operations to connect and wrap a wire around a tang like 91 are described, for example, in U.S. Pat. No. 5,493,770, and are normally required for wire that connects one coil to another, or for connection of initial leads to a tang when winding needs to start to wind a first coil, or for connection of final leads to a tang when winding of the last coil has been completed.

Termination member 80 is also capable of motion in the direction X' opposite to direction X for moving away from tang 91, after the connection operation has been completed, i.e. in order to return to the position shown in FIGS. 5 and 6.

Termination member 80 is bolted to carriage member 82 by means of bolts 87. Carriage member 82 is assembled to slide in key way 92 of support member 23 to move in direction X and X' when required, like has been described in the foregoing. The movement of termination member 80 in directions X and X' occurs by moving carriage 82 respectfully in direction X and X'. Termination member 80 moves through passage 81 of first wire guide 32 when required to move in the directions X and X'.

Carriage 82 is provided with passage 82'. Pin 84 crosses passage 82' and is integral to carriage 82. Lever arm 83 is hinged on pin 88 to be able to rotate around pin 88. Pin 88 crosses passage 93 of support member 23 and is integral to support member 23. End 83" has the form of a fork which receives pin 84, as shown in FIG. 6. End 83' of lever arm 83 is received in seat 85 of support member 35.

Carriage 82 is moved in direction X by moving support member 35 in opposite direction X'. Tubular member 18 is moved in direction X' to move support member 35 in direction X'. In this situation, end 83' of lever arm 83 is pushed in direction X' by side 85' of seat 85, like is the instant shown in FIG. 6. Consequently, lever arm 83 rotates around pin 88 to cause pin 84 to be pushed in direction X. This has the consequence of moving carriage 82 in direction X.

Spring 86, is connected between carriage 82 and fixture 94, as shown in FIG. 5. A similar spring and connection is present on the opposite side of carriage 82, where FIG. 5 has the section representation. Fixture 94 is fixed to support member 23 by bolts 89. Registration bolt 95 which is screwed into fixture 94 abuts against carriage 82 and can be used to adjust the extreme position that carriage 82 has in direction X'. This adjustment determines the position of lever arm 83 with respect to further movements of support member 35 in direction X, like is required during winding.

In fact, support member 35 moves in direction X and X' to accomplish winding of the turns. During winding, support member 35 is more nearer to core 10 than the position it has in FIGS. 5 and 6. In this situation of winding, lever arm 83 is maintained stationary due to the pull of the springs like 86 of carriage 82 against bolt 95, whilst seat 85 of support member 35 moves in directions X and X' without abutting and pushing end 83'.

Returning to the movement of termination member 80 to reach tang 91, as caused by movement of carriage 82 in direction X, spring 86, which becomes stretched during this movement is successively used to recall carriage 32, i.e. to cause carriage 32 to move in direction X' and bring it in abutment against registration bolt 95, when termination member is required to move away from the core by movement of support member 35 in opposite direction X.

According to this arrangement, termination member 80 is moved in direction X to seat tang 91 for connection of the wire leads, when first wire guide 32 is moved oppositely i.e. in direction X' to reach a more distant position outside of core 10, therefore when first wire guide 32 has completed winding of a coil. Similarly, termination member 80 is moved in direction X' to come away from tang 91, once connection and wrapping of the wire leads has been completed, i.e. when first wire guide 32 needs to be moved towards pole 10c for winding.

The foregoing description of a specific embodiment will so fully reveal the invention according to the conceptual point of view, that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. Apparatus for winding coils of wire conductor around respective poles of a core of a dynamo electric machine component; the coils having turns, wherein a turn is formed of two opposite longitudinal stretches, each longitudinal stretch being deposited in a respective slot, and two stretches of a turn being each deposited adjacent a respective axial end of the pole; the apparatus comprising:
   a wire dispenser arm for rotating around the poles to dispense the wire that forms the wire turns;
   a first wire guide positioned and moved during winding adjacent an axial end of a pole being wound to form a coil;
   a second wire guide positioned and moved within a first slot adjacent to the pole being wound;
   a third wire guide positioned and moved within a second slot adjacent to the pole being wound;
   a first support member for supporting the first wire guide;
   a second support member for supporting the second wire guide and the third wire guide;
   first guide means for guiding the second wire guide along a respective axis of the first slot, and wherein the first wire guide is supported by the second support member;
   second guide means for guiding the third wire guide along a respective axis of the second slot, and the second wire guide being supported by the second support member;
   means for moving the first support member to move the first wire guide along a movement axis, the second wire guide and the third wire guide in a predetermined alignment with respect to each other and with the pole being wound, the second wire guide and the third wire guide being respectively moved along the first and the second guide means.

2. Apparatus of claim 1 wherein the means for moving comprise means for connecting the second wire guide to the first support member on a first side with respect to the movement axis and the third wire guide to the first support member on a second side with respect to the movement axis.

3. Apparatus of claim 1 wherein the first wire guide moves along the movement axis parallel to the radial direction of the pole; the second wire guide moves along a path that is inclined to the movement axis and positioned on a first side of the movement axis; and the third wire guide moves along a path that is inclined to the movement axis and positioned on a second side with respect to the movement axis.

4. Apparatus of claim 1 wherein the means for moving comprises a first tubular member that moves along the axis of rotation of the wire dispenser arm and the wire to be wound runs through the tubular member to reach the wire dispenser arm.

5. Apparatus of claim 4 further comprising a second tubular member surrounding the first tubular member; the wire dispenser arm being fixed to the second tubular member and the second tubular member being rotated directly by a stator of an electric motor.

6. Apparatus of claim 1 wherein the means for moving comprises a screw transmission and a programmable drive for moving the first support member according to a pre-set movement function.

7. Apparatus of claim 1 wherein the second support member is maintained stationary around the axis of rotation of the wire dispenser arm by a belt transmission, or by a gear transmission, the transmission being capable of rotating a shaft assembled eccentric and integral to the wire dispenser arm.

8. Apparatus of claim 1 further comprising a termination member for connection of coil leads to termination structure of the core;
   transmission means for transmitting motion to the termination member from the first support member; and the termination member being supported and guided by the second support member for the motion.

9. Apparatus of claim 8 wherein the transmission means inverts the direction of motion transmitted by the first support member.

10. Apparatus of claim 9 wherein first support member comprises a seat for receiving a portion of the transmission means.

11. Apparatus of claim 8 wherein the first guide member is provided with a passage where the termination member moves to be positioned at the termination structure of the core.

12. Method for winding coils of wire conductor around respective poles of a core of a dynamo electric machine component; the coils having turns, wherein a turn is formed of two opposite longitudinal stretches, each longitudinal stretch being deposited in a respective slot, and two stretches of the turn are each deposited adjacent a respective axial end of the pole; the method comprising the steps of:
   forming the wire turns of a coil using a wire dispenser arm rotating around the poles to dispense the wire;

positioning and moving a first wire guide during winding adjacent an axial end of a pole being wound;

positioning and moving a second wire guide within a first slot adjacent to the pole being wound;

positioning and moving a third wire guide positioned within a second slot adjacent to the pole being wound;

supporting the first wire guide using a first support member;

supporting the second wire guide and the third wire guide using a second support member;

guiding the second wire guide along a respective axis of the first slot using first guide means supported by the second support member;

guiding the third wire guide along a respective axis of the second slot using second guide means supported by the second support member;

moving the first support member to move the first wire guide along a movement axis, the second wire guide and the third wire guide in a predetermined alignment with respect to each other and with the pole being wound, and moving the second wire guide and the third wire guide respectively along the first and the second guide means.

13. Method of claim 12 further comprising connecting the second wire guide to the first support member on a first side with respect to the movement axis and the third wire guide to the first support member on a second side with respect to the movement axis.

14. Method of claim 12 further comprising moving the first wire guide along the movement axis parallel to the radial direction of the pole;

moving the second wire guide along a path that is inclined to the movement axis and positioned on a fist side of the movement axis;

moving the third wire guide along a path that is inclined to the movement axis and positioned on a second side with respect to the movement axis.

15. Method of claim 14 further comprising a step of providing a second tubular member surrounding the first tubular member; the wire dispenser arm being fixed to the first tubular member and the second tubular member.

16. Method of claim 12 wherein the moving step comprises moving a first tubular member along the axis of rotation of the wire dispenser arm and causing the wire to be wound to run through the tubular member to reach the wire dispenser arm.

17. Method of claim 12 further comprising a step of moving the first support member according to a predetermined movement function.

18. Method of claim 12 further comprising a step of aligning guiding edges of the first wire guide, the second wire guide and the third wire guide with the positions of the pole being wound as a function of the rotations of the wire dispenser arm.

19. Method of claim 12 further comprising a step of providing a termination member for connection of coil leads to a termination structure of the core.

20. Method of claim 19 further comprising a step of moving the termination member towards the core for connection of the wire leads by moving the first wire guide member away from the core.

21. Apparatus for winding coils of wire conductor around respective poles of a core of a dynamo electric machine component; the coils having turns, wherein a turn is formed of two opposite longitudinal stretches, each longitudinal stretch being deposited in a respective slot, and two stretches of a turn being each deposited adjacent a respective axial end of the pole; the apparatus comprising:

a wire dispenser arm for rotating around the poles to dispense the wire that forms the wire turns;

a first wire guide positioned and moved during winding adjacent an axial end of a pole being wound to form a coil;

a second wire guide positioned and moved within a first slot adjacent to the pole being wound;

a third wire guide positioned and moved within a second slot adjacent to the pole being wound;

a termination member moveable within a passage of the first wire guide.

* * * * *